(12) United States Patent
Wang et al.

(10) Patent No.: US 9,045,630 B2
(45) Date of Patent: *Jun. 2, 2015

(54) EPOXY FUNCTIONAL POLYSTYRENE FOR ENHANCED PLA MISCIBILITY

(75) Inventors: Wei Wang, League City, TX (US); David K. Knoeppel, League City, TX (US); Fengkui Li, Houston, TX (US); Jose M. Sosa, Deer Park, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 111 days.

This patent is subject to a terminal disclaimer.

(21) Appl. No.: 13/171,819

(22) Filed: Jun. 29, 2011

(65) Prior Publication Data
US 2013/0005852 A1  Jan. 3, 2013

(51) Int. Cl.
*C08L 25/06* (2006.01)
*C08L 35/06* (2006.01)
*C08L 101/00* (2006.01)
*C08L 29/04* (2006.01)
*C08L 67/00* (2006.01)

(52) U.S. Cl.
CPC ............... *C08L 35/06* (2013.01); *C08L 101/00* (2013.01); *C08L 67/00* (2013.01); *C08L 29/04* (2013.01); *C08L 25/06* (2013.01)

(58) Field of Classification Search
CPC ....... C08L 25/06; C08L 35/06; C08L 101/00; C08L 29/04; C08L 67/00
USPC .......................................................... 524/504
See application file for complete search history.

(56) References Cited

U.S. PATENT DOCUMENTS

| 7,683,117 B2 * | 3/2010 | Moriyama et al. ............. 524/416 |
| 2003/0176546 A1 * | 9/2003 | Hoshi et al. .................... 524/323 |
| 2008/0016144 A1 | 1/2008 | Hyun et al. |
| 2008/0161449 A1 | 7/2008 | Yamamoto et al. |
| 2008/0262151 A1 * | 10/2008 | Ishii et al. ..................... 524/599 |
| 2010/0160505 A1 | 6/2010 | Kumazawa et al. |
| 2010/0233146 A1 | 9/2010 | McDaniel |
| 2010/0249268 A1 | 9/2010 | Schmidt et al. |
| 2011/0071247 A1 * | 3/2011 | Ishii et al. ..................... 524/504 |
| 2012/0010363 A1 * | 1/2012 | Hsu et al. .................... 525/54.31 |
| 2012/0184678 A1 | 7/2012 | Deeter et al. |
| 2013/0005886 A1 * | 1/2013 | Wang et al. ................... 524/388 |

FOREIGN PATENT DOCUMENTS

WO  2011011498 A2  1/2011

OTHER PUBLICATIONS

International Search Report with Written Opinion issued in PCT Patent Application No. PCT/US12/040822, dated Aug. 27, 2012 (9 pages).

* cited by examiner

*Primary Examiner* — Angela C Scott

(57) ABSTRACT

Polystyrene blends and methods of making polystyrene blends including combining a styrene monomer and an epoxy-functional comonomer to form a combined mixture, subjecting the combined mixture to polymerization to obtain a polystyrene copolymer and combining the polystyrene copolymer with a biodegradable polymer to obtain a polystyrene blend.

21 Claims, 8 Drawing Sheets

EPOXY FUNCTIONAL POLYSTYRENE FOR ENHANCED PLA MISCIBILITY

FIELD

The present invention is generally related to biodegradable polymer compositions. More specifically, the present invention is related to polystyrene blends containing biodegradable polymer compositions.

BACKGROUND

Styrene, also known, as vinyl benzene, is an aromatic compound that is produced in industrial quantities from ethyl benzene. The most common method of styrene production comprises the dehydrogenation of ethylbenzene, which produces a crude product of styrene monomer and unreacted ethylbenzene and hydrogen. Polystyrene is an aromatic polymer produced from styrene monomer. Polystyrene is a widely used polymer commonly found in many commercial applications.

Many industries seek to replace the metals used for structural materials with plastics. Plastics like polystyrene are typically lighter and less expensive than metals. Plastics may also be used as thermal or electrical insulators because they do not typically interfere with magnetic or electrical signals. Polystyrene is a durable and inexpensive polymer that is frequently encountered in daily life. However, polystyrene is typically weaker than metals. Thus, polystyrene is commonly combined with other polymers or composite materials such as fibers to provide improved strength and other properties. Some of the varied applications of polystyrene include insulation, foam cups, disposable cutlery, food packaging, office supplies, CD/DVD cases, housewares, appliance linings, cosmetics packaging, toys, computer housings, bottles, tubing, and dunnage.

Polystyrene containing products are often discarded and only a small fraction of discarded polystyrene products are recovered and recycled. In addition, byproducts and excess amounts of polystyrene and polystyrene containing compositions are produced during the process of molding, shaping and producing the products containing polystyrene. These byproducts, along with post consumer polystyrene products, often become waste. This waste typically ends up in landfills, or incinerators, or sometimes results in litter. Most of these products are non-biodegradable and thus remain long after disposal.

Poly(lactic acid) or PLA is a bio-derived, biodegradable and compostable polymer. Use of PLA as a biodegradable modifier to polystyrene brings additional marketable "environmentally friendly" value to commodity polystyrene and can add a biodegradable aspect to the otherwise non-biodegradable commodity polystyrene. However, combining these two materials has proven to be difficult. PLA and polystyrene form an immiscible polymer blend when combined, therefore, the combination of the two materials into one homogenous phase has been difficult. These heterogeneous mixtures of polystyrene and PLA have not resulted in products that can replace stronger, non-biodegradable, polystyrene blends currently on the market.

It would thus be desirable to obtain a homogenous polystyrene blend containing PLA. It would also be desirable to obtain a biodegradable polystyrene blend that is strong enough to be used in a wide variety of applications.

SUMMARY

An embodiment of the invention, either by itself or in combination with other embodiments is a biodegradable blend having a styrenic co-polymer and a biodegradable polymer where the styrenic copolymer includes a styrenic monomer and one or more of an epoxy-functional monomer, a styrene monomer, a polar co-monomer, and epoxidized glycerides oil. The styrenic monomer can be chosen from the group of styrene, alpha-methyl styrene, vinyl toluene, p-methyl styrene, t-butyl styrene, o-chlorostyrene, vinyl pyridine, and any combinations thereof. An embodiment of the invention, either by itself or in combination with other embodiments the styrenic co-polymer can be present in the blend in amounts ranging from 80 to 99 wt % based on the total weight of the blend.

An embodiment of the invention, either by itself or in combination with other embodiments the biodegradable polymer can be selected from the group of polylactic acid (PLA), polyhydroxybutyrates (PHB), polyhydroxyalkanoates (PHA), polycaprolactone (PCL), polyvinyl alcohol (PVA), and copolymers thereof and combinations thereof. An embodiment of the invention, either by itself or in combination with other embodiments the biodegradable polymer is present in the blend in amounts ranging from 1 to 20 wt % based on the total weight of the blend.

An embodiment of the invention, either by itself or in combination with other embodiments, the epoxy-functional monomer can be an epoxy-functional (meth)acrylic monomer and can optionally be selected from the group of glycidyl acrylate and glycidyl methacrylate and combinations thereof. In an embodiment the epoxy-functional monomer is present in the styrenic copolymer in amounts ranging from 1 to 10 wt %.

In an embodiment the blend can have a particle size distribution having a peak particle size ranging from 0.3 to 3 µm.

An embodiment of the invention, either by itself or in combination with other embodiments, can include a plasticizer selected from the group of triglyceride oils. The plasticizer can be present in amounts ranging from 0.5 to 10 wt % based on the total weight of the blend.

An embodiment of the invention, either by itself or in combination with other embodiments, can include an article of manufacture comprising the blend described herein.

An embodiment of the invention, either by itself or in combination with other embodiments, is a method of making a polystyrene blend that includes combining a styrene monomer and an epoxy-functional (meth)acrylic monomer to form a combined mixture, subjecting the combined mixture to polymerization to obtain a polystyrene co-polymer, and combining the polystyrene co-polymer with PLA to obtain a polystyrene blend.

The epoxy-functional (meth)acrylic monomer can be added in amounts of 1 to 10 wt % based on the total weight of the combined mixture and can be chosen from the group of glycidyl acrylate, glycidyl methacrylate, and blends thereof.

In an embodiment of the invention, either by itself or in combination with other embodiments, the PLA is combined with the polystyrene co-polymer in amounts ranging from 1 to 10 wt % PLA based on the total weight of the polystyrene blend.

An embodiment of the invention, either by itself or in combination with other embodiments, can include adding a polar additive to the combined mixture prior to combining the polystyrene copolymer with the PLA.

An embodiment of the invention, either by itself or in combination with other embodiments, is a method of making a polystyrene blend that includes combining a styrene monomer, a polar functional vinyl monomer, and an epoxy containing additive to form a combined mixture. The combined mixture is subjected to polymerization to obtain a polystyrene copolymer which is then combined with a biodegradable polymer to obtain a polystyrene blend.

An embodiment of the invention, either by itself or in combination with other embodiments, can have the epoxy containing additive selected from the group consisting of triglyceride oils, and combinations thereof. The epoxy containing additive can be added to the blend in amounts ranging from 0.5 to 10 wt % based on the total weight of the blend and the polar functional monomer can be added to the blend in amounts ranging from 1 to 5 wt %. based on the total weight of the copolymer.

In an embodiment of the invention, either by itself or in combination with other embodiments, the biodegradable polymer is selected from the group of polylactic acid (PLA), polyhydroxybutyrates (PHB), polyhydroxyalkanoates (PHA), polycaprolactone (PCL), polyvinyl alcohol (PVA), and copolymers thereof, and combinations thereof.

In an embodiment of the invention, either by itself or in combination with other embodiments, the polar additive is selected from the group of hydroxyethylmethacrylate (HEMA), caprolactone acrylate, esters, ethers, carboxylic acid, silane, fluorinated monomers, and oxygen-containing monomers. The polar additive can be added in amounts ranging from 1.5 to 12.5 wt % based on the total weight of the combined mixture.

The various embodiments of the present invention can be joined in combination with other embodiments of the invention and the listed embodiments herein are not meant to limit the invention. All combinations of embodiments of the invention are enabled, even if not given in a particular example herein.

DETAILED DESCRIPTION

Figure 1:
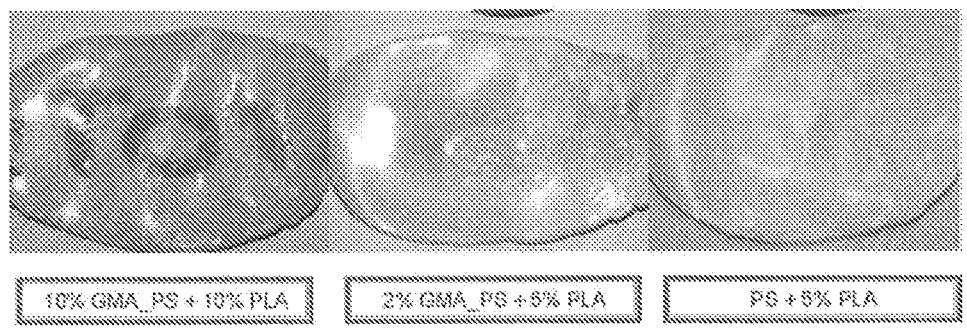
FIG. 1 illustrates the affect of GMA on the opaqueness of sample blends.

The present invention includes blends of styrenic polymers and biodegradable polymers. In an embodiment, the present invention includes a blend of homopolymers and/or copolymers of polystyrene and poly(lactic acid), or PLA, based homopolymers and/or copolymers.

In an embodiment, the blends of the present invention include a styrenic polymer. In another embodiment, the styrenic polymer includes polymers of monovinylaromatic compounds, such as styrene, alphamethyl styrene and ring-substituted styrenes. In an alternative embodiment, the styrenic polymer includes a homopolymer and/or copolymer of polystyrene. In a further embodiment, the styrenic polymer is polystyrene. In an even further embodiment, styrenic monomers for use in the styrenic polymer composition can be selected from the group of styrene, alpha-methyl styrene, vinyl toluene, p-methyl styrene, t-butyl styrene, o-chlorostyrene, vinyl pyridine, and any combinations thereof. The styrenic polymeric component in the blend of the present invention can be produced by any known process. In an embodiment, the styrenic polymer is polystyrene.

The blend of the present invention may contain any desired amounts of a styrenic polymer. In an embodiment, the blend contains at least 50 wt % of a styrenic polymer. In another embodiment, the blend contains a styrenic polymer in amounts ranging from 1 to 99 wt %, 50 to 95 wt %, 60 to 92 wt %, and optionally 75 to 90 wt %. In a further embodiment, the blend contains a styrene polymer in amounts ranging from 80 to 99 wt %. In an even further embodiment, the blend contains a styrenic polymer in amounts ranging from 90 to 95 wt %.

The styrenic polymer of the present invention may include general-purpose polystyrene (GPPS), high-impact polystyrene (HIPS), or any combinations of the two. In an embodiment, the styrenic polymer of the present invention may be HIPS that further contains an elastomeric material. In an embodiment, the HIPS may contain an elastomeric phase embedded in the polystyrene matrix, which results in the styrenic polymer having an increased impact resistance.

The HIPS may contain any desired elastomeric material. In an embodiment, the elastomeric material is a conjugated diene monomer. In an embodiment, the conjugated diene monomers may include without limitation 1,3-butadiene, 2-methyl-1,3-butadiene, 2-chloro-1,3 butadiene, 2-methyl-1,3-butadiene, and 2-chloro-1,3-butadiene. In another embodiment, the elastomer is an aliphatic conjugated diene monomer. In an embodiment, the aliphatic conjugated diene monomers include $C_4$ to $C_9$ dienes such as butadiene monomers. Blends or copolymers of the diene monomers may also be used as well as mixtures or blends of one or more elastomers. In an embodiment, the elastomer includes a homopolymer of a diene monomer. In another embodient, the elastomer includes polybutadiene. The elastomer may be present in the HIPS in any desired amounts. In an embodiment, the elastomer may be present in the HIPS in amounts ranging from 1 to 20 wt. %, alternatively from 2 to 15 wt. %, and alternatively 5 to 11 wt. % based on the total weight of the HIPS.

The styrenic polymer of the present invention may be a styrenic copolymer. The styrenic polymer of the present invention may be formed by co-polymerizing a first monomer with a second monomer. The first monomer and the second monomer may be co-polymerized by having the first monomer and the second monomer present in a reaction mixture that is subjected to polymerization conditions. The first monomer may include monovinylaromatic compounds, such as styrene, alpha-methyl styrene and ring-substituted styrenes. In an embodiment, the first monomer is selected from the group of styrene, alpha-methyl styrene, vinyl toluene, p-methyl styrene, t-butyl styrene, o-chlorostyrene, vinyl pyridine, and any combinations thereof. In another embodiment, styrene is used exclusively as the first monomer.

The first monomer may be present in the reaction mixture in any desired amounts. In an embodiment, the first monomer is present in the reaction mixture in amounts of at least 50 wt % of the reaction mixture. In another embodiment, the first monomer is present in the reaction mixture in amounts ranging from 90 to 99.9 wt % of the reaction mixture. In a further embodiment, the first monomer is present in the reaction mixture in amounts ranging from 95 to 99 wt %.

The second monomer may contain an epoxy functional group. In an embodiment, the second monomer containing an epoxy functional group is an epoxy-functional vinyl monomer. In an embodiment, the epoxy-functional vinyl monomer is an epoxy-functional (meth)acrylic monomer. In another embodiment, the epoxy-functional (meth)acrylic monomer includes both acrylates and methacrylates. In a further embodiment, the epoxy-functional (meth)acrylic monomer is selected from the group of glycidyl acrylate and glycidyl methacrylate (GMA). In an even further embodiment, the epoxy-functional monomer is selected from the group of allyl glycidyl ether, glycidyl ethacrylate, and glycidyl itoconate.

In an embodiment, the epoxy-functional vinyl monomer is present in the reaction mixture in amounts ranging from 1 to 25 wt %. In another embodiment, the epoxy-functional vinyl monomer is present in the reaction mixture in amounts ranging from 2.5 to 15 wt %. In a further embodiment, the epoxy-functional vinyl monomer is present in the reaction mixture in amounts ranging from 5 to 10 wt %.

The blends of the present invention may contain any biopolymer containing component. In an embodiment, the biodegradable polymer is selected from the group of polylactic acid (PLA), polyhydroxybutyrates (PHB), polyhydroxyalkanoates (PHA), polycaprolactone (PCL), and polyvinyl alcohol (PVA), and combinations thereof. In a further embodiment, the biodegradable polymer is selected from the group of polylactic acid (PLA), polyhydroxybutyrates (PHB), polyhydroxyalkanoates (PHA), polycaprolactone (PCL), polyvinyl alcohol (PVA), polybutylenesuccinate homopolymer, polybutyleneadipate homopolymer, polybutylenesuccinate-adipate copolymer, polyethylenesuccinate homopolymer, polyethyleneadipate homopolymer, polyethylenesuccinate-adipate copolymer, and a copolyester of an aliphatic polyester and combinations thereof. In a further embodiment, the biodegradable polymer and the bio-polymer are each selected from a polysaccharide such as starch, cellulose, and glycogen and other sugar-based polymers.

In an embodiment, the biodegradable polymer is polylactic acid. Poly(lactic acid), polylactic acid, or PLA, can be made from lactic acid (lactate). Lactic acid is a naturally occurring molecule that is widely used in foods as a preservative and flavoring agent. Lactic acid may be chemically synthesized or produced by microbial fermentation of sugars such as glucose or hexose. In an embodiment, lactic acid is produced by fermentation of sugar feed stocks. The sugar feed stocks may be obtained from farm products, farming by-products and wastes. In another embodiment, the sugar feed stocks are selected from the group of potato wastes, corn products, beet products, sugar cane wastes, and dairy wastes and combinations thereof. In an embodiment, the lactic acid produced by fermentation of sugar feed stocks is subsequently converted to obtain lactic acid monomers, which are then polymerized to obtain PLA.

Lactic acid monomers essentially exist in two stereoisomeric forms which yield morphologically distinct polymers selected from the group of poly(L-lactic acid), poly(D-lactic acid), poly(D,L-lactic acid), and meso-polylactic acids and any combinations thereof. PLA can include homopolymers and/or copolymers of lactic acid. The homopolymers of lactic acid can be selected from the group of poly(L-lactic acid), poly(D-lactic acid), and poly(D,L-lactic acid) and any combinations thereof. The copolymers of lactic acid may have a lactic acid comonomer content of at least 50 wt % based on the total weight of the copolymer. The copolymers of lactic acid may have a lactic acid comonomer content that ranges from 50 to 100 wt %, optionally from 60 to 95 wt %, optionally from 70 to 90 wt % based on the total weight of the copolymer.

Lactic acid cannot be directly polymerized to a useful product, instead, lactic acid is optionally oligomerized and catalytically dimerized to make a cyclic lactide monomer (lactic acid monomer). Although dimerization also generates water, it can be separated prior to polymerization. The polymerization may be performed by polycondensation methods or ring-opening polymerization methods. In an embodiment, PLA may be produced by polycondensation. In an embodiment in which the polymerization is performed by polycondensation, the lactic acid monomer may be directly subjected to dehydropolycondensation to obtain a desired polylactic acid composition. In the direct dehydration polycondensation method, the lactic acid may be subjected to azeotropic dehydration condensation in the presence of an organic solvent.

In an embodiment, the PLA may be produced by ring-opening polymerization. In ring-opening polymerization, lactide (i.e., cyclic dimmer of lactic acid) may be subjected to polymerization by the aid of a polymerization-adjusting agent and a catalyst to obtain polylactic acid.

The polylactic acid may have a weight average molecular weight ranging from 5,000 to 1,000,000; 10,000 to 400,000; 30,000 to 300,000; and optionally 100,000 to 250,000. In an embodiment, the polylactic acid can include commercially available polylactic acids such as those sold by NatureWorks LLC (owned by Cargill Corporation), including Ingeo PLA 3251D, NatureWorks PLA 4032, 4042, and 4060 trade names. The PLA 4032 grade may have a D isomer monomer content from 1.2 to 1.6 wt %, the PLA 4042 grade may have a D isomer monomer content from 3.7 to 4.8 wt %, and the PLA 4060 grade may have a D isomer monomer content from 11.0 to 13.0 wt %. In an embodiment the polylactic acid can have a D isomer monomer content from 0.5 to 30.0 wt %, optionally from 1.0 to 25.0 wt %, optionally from 1.0 to 20.0 wt %, optionally from 1.0 to 15.0 wt %.

The blend of the present invention may contain any amount of PLA in order to achieve desired properties. In an embodiment, the blend contains at least 0.1 wt % PLA. In another embodiment, the blend contains amounts ranging from 0.1 to 90 wt %, 0.5 to 50 wt %, 1 to 30 wt %, 2 to 20 wt %, 3 to 10 wt %, and optionally 5 wt % PLA. In a further embodiment, the blend contains PLA in amounts ranging from 1 to 10 wt % PLA. In an even further embodiment, the blend contains PLA in amounts ranging from 3 to 8 wt % PLA.

In addition to a styrenic polymer component and a PLA component, the blend of the present invention may also contain epoxy containing additives. The blend of the present invention may also contain plasticizers. In an embodiment, the plasticizers are selected from the group of epoxidized linseed oil and epoxidized soybean oil and combinations thereof. In an embodiment, the plasticizer(s) may be present in the blend in amounts of at least 0.1 wt % based on the total weight of the blend. In another embodiment, the plasticizer(s) may be present in the blend in amounts ranging from 0.5 to 10 wt %. In a further embodiment, the plasticizer(s) may be present in the blend in amounts ranging from 1 to 5 wt %. In an even further embodiment, the plasticizer(s) may be present in the blend in amounts ranging from 1.5 to 2.5 wt %.

The blend of the present invention may also contain a polar monomer in combination with an epoxy-functional monomer. In an embodiment, these polar monomers may be selected from the group of hydroxyethylmethacrylate (HEMA), caprolactone acrylate, esters, ethers, carboxylic acid, silane, fluorinated monomers, and other oxygen-containing monomers. In a further embodiment, the polar monomer is HEMA. In an embodiment, the polar monomer is present in amounts ranging from 0.5 to 15 wt % based on the total weight of the blend, optionally 1 to 10 wt %, optionally from 2 to 5 wt % based on the total weight of the blend.

In an embodiment, the polar monomer and the epoxy-functional monomer are present in amounts ranging from 0.5 to 15 wt % and 1 to 25 wt %, respectively, based on the total weight of the blend. In another embodiment, the polar monomer and the epoxy-functional monomer are present in amounts ranging from 1 to 10 wt % and 1.5 to 12.5 wt %, respectively, based on the total weight of the blend. In another embodiment, the polar monomer and the epoxy-functional monomer are present in amounts ranging from 2 to 5 wt % and 2.5 to 5.5 wt %, respectively, based on the total weight of the blend.

In an embodiment, the blend of the present invention may be prepared by co-polymerizing a styrenic monomer with an epoxy-functional monomer. In an embodiment, styrene monomer and the epoxy-functional monomer containing the epoxy functional group are combined and polymerized in a polymerization reactor wherein the styrene monomer and epoxy-functional monomer containing the epoxy functional group are copolymerized to produce a polystyrene copolymer. The polystyrene copolymer may then be mixed with a biodegradable polymer to obtain a biodegradable polymeric blend. The biodegradable polymeric blend may then be sent to an extruder or other step to obtain an end use article.

The polymerization of the styrenic monomer and the epoxy-functional monomer may be carried out using any method known to one having ordinary skill in the art of performing such polymerizations. In an embodiment, the polymerization may be carried out by using a polymerization initiator.

In an embodiment, the polymerization initiators include radical polymerization initiators. These radical polymerization initiators include but are not limited to perketals, hydroperoxides, peroxycarbonates and the like. In another embodiment, the polymerization initiators may be selected from the group of benzoyl peroxide, lauroyl peroxide, t-butyl peroxybenzoate, and 1,1-di-t-butylperoxy-2,4-di-t-butylcycleohexane, and combinations thereof. In an embodiment, the amount of the polymerization initiator is from 0 to 1 percent by weight of the monomers and co-monomers. In another embodiment, the amount of the polymerization initiator is from 0.01 to 0.5 percent by weight of the monomers and co-monomers. In a further embodiment, the amount of the polymerization initiator is from 0.025 to 0.05 percent by weight of the monomers and co-monomers.

Any process capable of processing or polymerizing styrenic monomers may be used to prepare the styrenic co-polymer of the present invention. In an embodiment, any polymerization reaction for preparing general purpose polystyrene or high-impact polystyrene may be used to prepare the styrenic co-polymer of the present invention. In an embodiment, the polymerization reaction to prepare the styrenic co-polymer may be carried out in a solution or mass polymerization process. Mass polymerization, or bulk polymerization, refers to the polymerization of a monomer in the absence of any medium other than the monomer and a catalyst or polymerization initiator. Solution polymerization refers to a polymerization process wherein the monomers and polymerization initiators are dissolved in a non-monomeric liquid solvent at the beginning of the polymerization reaction.

The polymerization may be either a batch process or a continuous process. In an embodiment, the polymerization reaction may be carried out using a continuous production process in a polymerization apparatus including a single reactor or multiple reactors. The styrenic polymer composition can be prepared using an upflow reactor, a downflow reactor, or any combinations thereof. The reactors and conditions for the production of a polymer composition, specifically polystyrene, are disclosed in U.S. Pat. No. 4,777,210, which is incorporated by reference herein in its entirety.

The temperature ranges useful in the polymerization process of the present disclosure can be selected to be consistent with the operational characteristics of the equipment used to perform the polymerization. In an embodiment, the polymerization temperature ranges from 90 to 240° C. In another embodiment, the polymerization temperature ranges from 100 to 180° C. In yet another embodiment, the polymerization reaction may be carried out in multiple reactors in which each reactor is operated under an optimum temperature range. For example, the polymerization reaction may be carried out in a reactor system employing a first polymerization reactor and a second polymerization reactor that may be either continuously stirred tank reactors (CSTR) or plug-flow reactors. In an embodiment, a polymerization process for the production of a styrenic co-polymer of the type disclosed herein containing multiple reactors may have the first reactor (e.g., a CSTR), also referred to as a prepolymerization reactor, operated under temperatures ranging from 90 to 135° C. while the second reactor (e.g. CSTR or plug flow) may be operated under temperatures ranging from 100 to 165° C.

In an alternative embodiment, the co-polymer may be obtained by polymerization in which heat is used as the initiator. In a further embodiment, the co-polymer may be prepared using a non-conventional initiator such as a metallocene catalyst as is disclosed in U.S. Pat. No. 6,706,827 to Lyu, et al., which is incorporated herein in its entirety by reference. In one embodiment, the monomers may be admixed with a solvent and then polymerized. In another embodiment, one of the monomers is dissolved in the other and then polymerized. In still another embodiment, the monomers may be fed concurrently and separately to a reactor, either neat or dissolved in a solvent, such as mineral oil. In yet another embodiment, the second monomer may be prepared in-situ or immediately prior to the polymerization by admixing the raw material components, such as an unsaturated acid or anhydride and a metal alkoxide, in-line or in the reactor. Any process for polymerizing monomers having polymerizable unsaturation know to be useful to those of ordinary skill in the art in preparing such polymers may be used. For example, the process disclosed in U.S. Pat. No. 5,540,813 to Sosa, et al., may be used and is incorporated herein in its entirety by reference. The processes disclosed in U.S. Pat. No. 3,660,535 to Finch, et al., and U.S. Pat. No. 3,658,946 to Bronstert, et al., may be used and are both incorporated herein by reference in their entirety.

In certain embodiments, the styrenic copolymer may be admixed with additives prior to being used in end use applications. For example, the styrenic copolymer may be admixed with additives that include without limitation stabilizers, chain transfer agents, antioxidants, UV stabilizers, lubricants, plasticizers, ultra-violet screening agents, oxidants, anti-oxidants, anti-static agents, ultraviolet light absorbents, fire retardants, processing oils, mold release agents, fillers, pigments/dyes, coloring agents, and other similar compositions. Any additive known to those of ordinary skill in the art to be useful in the preparation of styrenic copolymers may be used.

In an embodiment, styrene monomer is combined with an epoxy-functional comonomer and subsequently polymerized to form an epoxidized polystyrene copolymer. The epoxidized polystyrene copolymer can then be combined with PLA to obtain a blend.

In an embodiment, styrene monomer is combined with an epoxy-functional comonomer and subsequently polymerized to form an epoxidized polystyrene copolymer. The epoxidized polystyrene copolymer can then be combined with polystyrene and a biodegradable polymer to obtain a blend. In another embodiment, the polystyrene is selected from general-purpose polystyrene (GPPS) and high impact polystyrene (HIPS) and combinations thereof.

In an embodiment, styrene monomer is combined with an epoxy-functional monomer and subsequently polymerized to form a polystyrene copolymer. The polystyrene copolymer may then be combined with at least one epoxy containing additive and a biodegradable polymer to form a blend. In an embodiment, the polystyrene copolymer is first mixed with at least one epoxy containing additive and then mixed with biodegradable polymer to obtain a blend. In another embodiment, the polystyrene copolymer is first mixed with biodegradable polymer and then mixed with at least one epoxy containing additive to obtain a blend. In a further embodiment, the polystyrene copolymer is simultaneously combined with biodegradable polymer and at least one epoxy containing additive to obtain a blend. The final blend may then be sent to an extruder or other step to obtain an end use article. In an embodiment, the blend can be formed by combining the epoxidized polystyrene copolymer with the biodegradable polymer in an extruder or a mixer or combinations thereof.

In an embodiment, styrene monomer is combined with an epoxy-functional monomer and/or a polar comonomer and a plasticizer and subsequently polymerized to form an epoxidized polystyrene copolymer. The epoxidized polystyrene copolymer can then be combined with a biodegradable polymer to obtain a blend. In another embodiment, styrene monomer is combined with an epoxy-functional monomer and a polar additive and subsequently polymerized to form an epoxidized polystyrene copolymer.

The styrenic copolymer of the present invention may have a number average molecular weight (Mn) ranging from 40,000 g/mol to 10,000,000 g/mol. In another embodiment, the styrenic copolymer has an Mn ranging from 50,000 to 200,000 g/mol, optionally from 75,000 to 150,000 g/mol. The styrenic copolymer of the present invention may have a weight average molecular weight (Mw) ranging from 100,000 g/mol to 10,000,000 g/mol, optionally from 200,000 to 500,000 g/mol, optionally from 250,000 to 400,000 g/mol. The styrenic copolymer of the present invention may have a z-average molecular weight (Mz) ranging from 200,000 g/mol to 10,000,000 g/mol, optionally from 300,000 to 800,000 g/mol, optionally from 400,000 to 550,000 g/mol.

In an embodiment, the blend of the present invention has a polydispersity index (PDI) (Mw/Mn) ranging from 1.0 to 5.0. In another embodiment, the blend of the present invention has a polydispersity index ranging from 1.5 to 3.0. In a further embodiment, the blend of the present invention has a polydispersity index ranging from 2.0 to 2.5.

In an embodiment, the blend of the present invention has a melt flow index (MFI) ranging from 0.1 to 30, optionally from 1.0 to 5.0, optionally from 1.5 to 3.0, optionally from 2.0 to 2.5. In an embodiment, the blend of the present invention has a glass transition temperature (Tg) ranging from 50 to 200° C. In another embodiment, the blend of the present invention has a Tg ranging from 75 to 150° C. In a further embodiment, the blend of the present invention has a Tg ranging from 90 to 110° C.

In an embodiment, the blend of the present invention has an average particle size (phase domain size) distribution, defined as (D90-D10)/D50), ranging from 0.1 to 1000. In the equation, (D90-D10)/D50), D90, D10, and D50 represent diameters at which 90%, 10%, and 50% of particles are smaller than, respectively. In another embodiment, the blend has an average particle size distribution ranging from 10 to 1000.

In a further embodiment, the blend has a particle size distribution having a peak particle size ranging from 30 to 300 µm. In an alternative embodiment, the blend has a particle size distribution having a peak particle size ranging from 0.3 to 3 µm. In another alternative embodiment, the blend has a particle size distribution having a peak particle size ranging from 2 to 10 µm.

In an embodiment, the blend of the present invention has an average particle size ranging from 0.3 to 30 µm. In another embodiment, the blend of the present invention has an average particle size ranging from 1 to 15 µm. In a further embodiment, the blend of the present invention has an average particle size ranging from 2 to 8 µm.

An end use article may include a blend of the present invention. In an embodiment, the articles include films, sheets and thermoformed or foamed articles. For example, a final article may be thermoformed from a sheet containing the blend. End use articles may be obtained from the polymeric compositions of this disclosure. In an embodiment, an article can be obtained by subjecting the polymeric composition to a plastics shaping process such as blow molding, extrusion, injection blow molding, injection stretch blow molding, thermoforming, and the like. The polymeric composition may be formed into end use articles including food packaging, office supplies, plastic lumber, replacement lumber, patio decking, structural supports, laminate flooring compositions, polymeric foam substrate, decorative surfaces, outdoor furniture, point-of-purchase signs and displays, housewares and consumer goods, building insulation, cosmetics packaging, outdoor replacement materials, lids and food/beverage containers, appliances, utensils, electronic components, automotive parts, enclosures, protective head gear, medical supplies, toys, golf clubs and accessories, piping, business machines and telephone components, shower heads, door handles, faucet handles, and the like.

EXAMPLES

Example 1

Epoxy functionalized polystyrene was prepared in batch reactions by copolymerizing styrene with glycidyl methacrylate (GMA) at varied concentrations ranging from 0 to 10 wt % in the feed. These batch formulations are described in Table 1.

TABLE 1

Feed Formulations in Batch Synthesis of GMA-modified Polystyrene

| | Run No. | | | |
|---|---|---|---|---|
| | 1 | 2 | 3 | 4 |
| Styrene (grams) | 200 | 196 | 190 | 180 |
| GMA (grams) | 0 | 4 | 10 | 20 |
| GMA (%) | 0% | 2% | 5% | 10% |
| TOTAL (grams) | 200 | 200 | 200 | 200 |

The batch polymerization reactions were carried out in a CSTR-type batch reactor. Lupersol-233, commercially produced by Arkema, Inc., was added as the initiator with an initial concentration of 170 ppm in the reaction mixture prior to the reaction. The reaction was run isothermally at 130° C. under continuous agitation at 150 rpm for approximately 3 hours or until 75% conversion of styrene had been reached. The reaction mixture was then transferred onto an aluminum pan and devolatized under active vacuum at less than 10 torr at 225° C. for 45 minutes.

Epoxy functional groups were incorporated into the polystyrene backbone through copolymerization of GMA and styrene under the same conditions of the homopolymerization of styrene alone. The reactivity ratios of GMA and styrene at 60-90° C. are $r_{GMA}=0.56$ and $r_S=0.41$, which ensures that the resulting copolymer has a largely random distribution of comonomers.

The epoxy functionalized polystyrene prepared by copolymerizing styrene with GMA at the varied concentrations described in Table 2 demonstrated a relatively constant weight-averaged molecular weight of about 270,000 g/mol and a relatively unchanged melt flow rate at 2.1 to 2.5 g/10 min, regardless of the GMA loading. This was in contrast to hydroxyl functional polystyrene where the molecular weights, especially Mz, steadily increased along with comonomer (HEMA) concentration. As a result, the melt flow of HEMA-modified polystyrene decreased with the loading of HEMA. Higher loading of GMA lead to lower glass transition temperatures. The Tg is in contrast to that of HEMA-modified polystyrene where the formation of H-bonding held the Tg relatively constant versus the epoxy counterpart.

The compatibility of the modified polystyrene with PLA was evaluated by physically blending the modified polystyrene with 5 wt % PLA, and in one case 10 wt % PLA, in a mixer. The mixer was operated under a temperature of 210° C. under a nitrogen atmosphere for 3 minutes with agitation under speeds of 60 rpm. The reaction between epoxy functionality and the terminal group of PLA can be expected as follows:

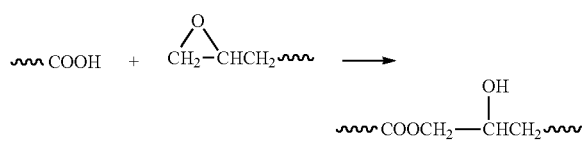

The size of PLA phase domains in the blend was further evaluated by solution light scattering utilizing a Malvern particle size analyzer. The samples were dispersed in MEK, a good solvent for polystyrene but not for PLA.

The epoxy functional polystyrene was characterized in terms of molecular weights, melt flow and thermal behavior as listed in Table 2.

TABLE 2

Molecular Weights, Melt Index and Glass Transition Temperature of Epoxy Functional Polystyrene

| | GMA (wt %) | | | |
|---|---|---|---|---|
| | 0% | 2% | 5% | 10% |
| Mn/g · mol$^{-1}$ | 129,000 | 120,000 | 125,000 | 113,000 |
| Mw/g · mol$^{-1}$ | 269,000 | 265,000 | 277,000 | 262,000 |
| Mz/g · mol$^{-1}$ | 308,000 | 411,000 | 435,000 | 423,000 |
| Mp/g · mol$^{-1}$ | 260,000 | 255,000 | 261,000 | 244,000 |
| Mw/Mn | 2.1 | 2.2 | 2.2 | 2.3 |
| MFI/g · 10 min$^{-1}$ | 2.2 | 2.1 | 2.4 | 2.5 |

TABLE 2-continued

Molecular Weights, Melt Index and Glass Transition Temperature of Epoxy Functional Polystyrene

| | GMA (wt %) | | | |
|---|---|---|---|---|
| | 0% | 2% | 5% | 10% |
| Tg/° C. | 104.4 | 102.9 | 101.2 | 97.8 |

MFI Measured per ASTM D-1238 at 200° C., 5 kg

Example 2

Epoxy-functionalized polystyrene was prepared by copolymerizing 5 wt % of glycidyl methacrylate (GMA), based on the total weight of the feed, and styrene monomer in a batch reaction. To evaluate the polystyrene compatibility with PLA, the polystyrene copolymer was blended with 5 wt % PLA in a mixer. The mixer was operated under a temperature of 210° C. under a nitrogen atmosphere for 3 minutes with agitation under speeds of 60 rpm. Normally, blends of PLA and polystyrene are opaque due to relatively large PLA phase domains in polystyrene. However, the blend of PLA and polystyrene copolymerized with GMA was translucent, as illustrated in FIG. 1.

Figure 2:
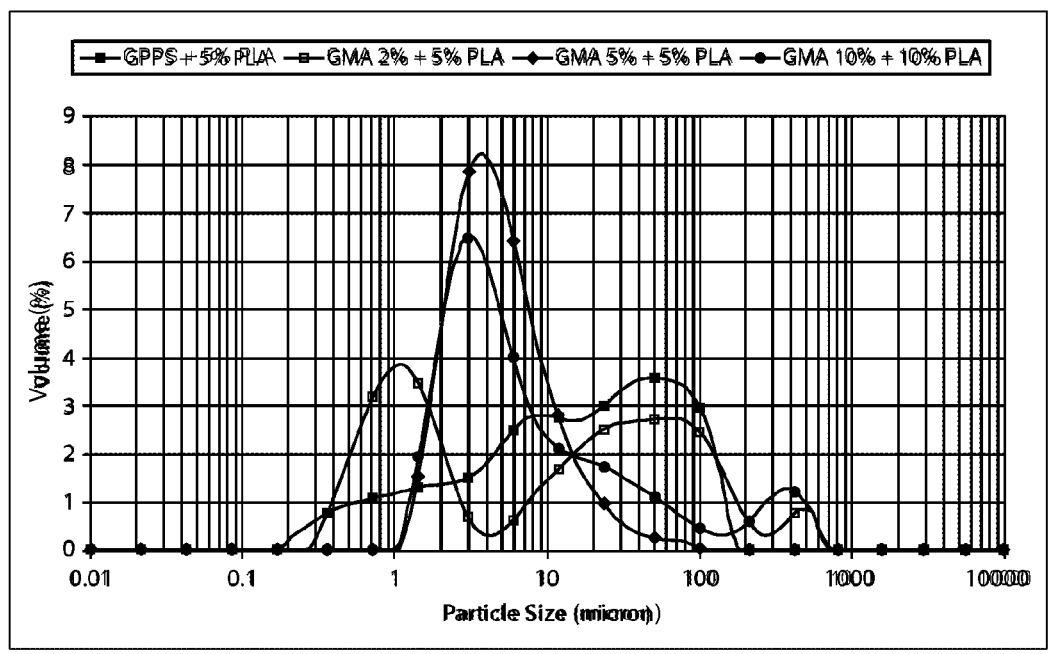
FIG. 2 is a graph illustrating PLA phase domain size in different epoxy-functionalized polystyrene samples.

The size of PLA phase domains in the blend was further evaluated by solution light scattering. The samples were dispersed in methyl ethyl ketone (MEK), a good solvent for polystyrene but not for PLA. FIG. 2 compares the PLA particle size in GMA-modified polystyrene with other polymer blends having varying amounts of PLA and GMA. The GMA-modified polystyrene improved the dispersion of PLA as evident from the reduction of particle size, compared to general-purpose polystyrene (GPPS). Higher loading of GMA appeared to "modulate" the PLA domain size distribution to be narrower, without tailing into either end of particle size distribution.

Example 3

Other modified polystyrene materials were developed according to the formulations listed in Table 3, where the modifier or the modifier combinations were HEMA, HEMA+ GMA, and HEMA+epoxidized linseed oil (Vikoflex 7190), and 3-isopropenyl-α,α-dimethylbenzyl isocyanate (Isocyanate).

TABLE 3

Formulations in Batch Synthesis of various modified polystrene (unit: Gram)

| Component | Wt % | Run 1 | Run 2 | Run 3 | Run 4 |
|---|---|---|---|---|---|
| Styrene | | 195 g | 191 g | 190.44 g | 190 g |
| HEMA | 2.50% | 5 g | 5 g | 5 g | 0 |
| GMA | 2.00% | 0 | 4 g | 0 | 0 |
| Vikoflex 7190 | 2.28% | 0 | 0 | 4.56 g | 0 |
| Isocyanate | 5.00% | 0 | 0 | 0 | 10 g |
| TOTAL | | 200 g | 200 g | 200 g | 200 g |

Again, the batch polymerization reactions were carried out in a CSTR-type batch reactor. Lupersol-233 was added as the initiator with an initial concentration of 170 ppm in the reaction mixture prior to the reaction. The reaction was run isothermally at 130° C. under continuous agitation at 150 rpm for approximately 3 hours or until 75% conversion of styrene had been reached. The reaction mixture was then transferred onto an aluminum pan and devolatized under active vacuum at less than 10 torr at 225° C. for 45 minutes.

In one example shown in Table 3 as Run 2, 2.5 wt. % of HEMA was added into the feed, along with 2 wt. % of GMA. Under appropriate conditions (e.g., under a basic and de-protonated environment), the hydroxyl group may react with epoxy functionalities. Such side reaction leads to crosslinking and is undesirable as it reduces the availability of both HEMA and GMA for PLA compatibilization. The characterization of the various modified polystyrenes, depicted in Table 4, do not show any significant increase in molecular weight, which confirms that the proposed side reaction above was limited under current polymerization conditions.

TABLE 4

Characterization of Various Modified Polystyrene

| Modified PS | Mn g·mol$^{-1}$ | Mw g·mol$^{-1}$ | Mz g·mol$^{-1}$ | Mp g·mol$^{-1}$ | Mw/Mn | MFI g·10 min$^{-1}$ | Tg ° C. |
|---|---|---|---|---|---|---|---|
| HEMA 2.5% | 142,000 | 336,000 | 523,000 | 315,000 | 2.4 | 1.9~2.3 | 103.2 |
| GMA 2% | 120,000 | 265,000 | 411,000 | 255,000 | 2.2 | 2.1 | 102.9 |
| HEMA 2.5% + V7190 | 122,000 | 264,000 | 414,000 | 247,000 | 2.2 | 4.0 | 89.7 |
| HEMA 2.5% + GMA 2% | 124,000 | 305,000 | 513,000 | 268,000 | 2.5 | 1.8 | 101.7 |
| Isocyanate | | | | | | 1.6 | 101.8 |

Incorporation of epoxy functionality into polystyrene can also be achieved through the use of epoxy-containing additives such as Vikoflex 7190 epoxidized linseed oil as shown in Table 4. With the use of epoxidized linseed oil, the compatibilization reaction occurs through the additives instead of through the polystyrene backbone. The epoxidized linseed oil was a good plasticizer as shown by higher melt flow index and lower glass transition temperature.

Besides the use of epoxy functional groups, reactive compatibilization with PLA can be conducted through other functionalities such as isocyanate or oxazoline. A modified polystyrene was prepared with the addition of 5 wt. % of 3-Isopropenyl-α,α-dimethylbenzyl isocyanate as co-monomer. The isocyanate group can react with the terminal groups of polyesters according to the scheme shown below. The isocyanate was chosen for comparison with epoxy-functionalized material.

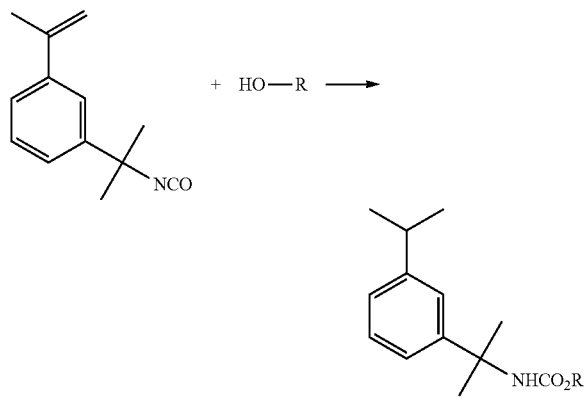

Example 4

Figure 5:
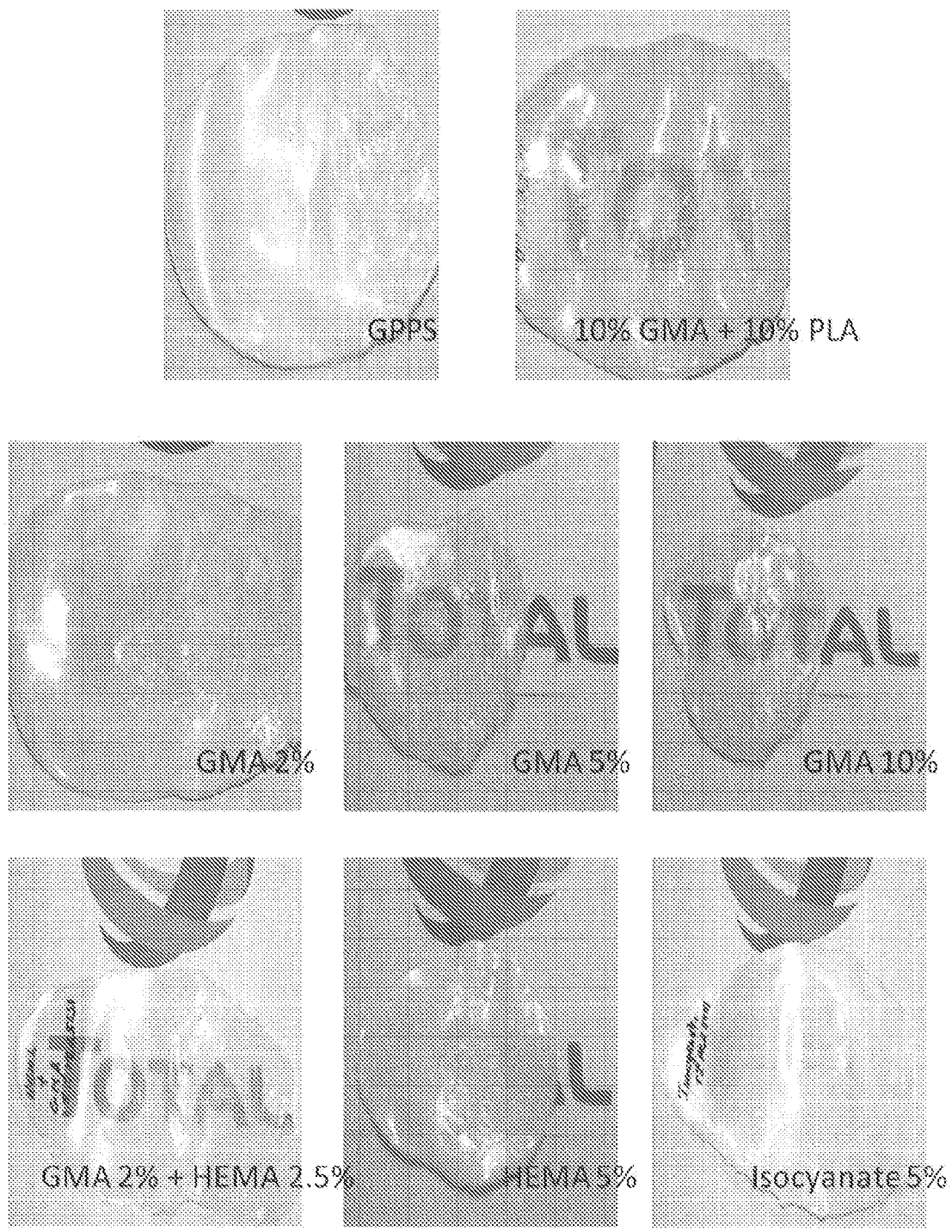
FIG. 5 illustrates the affect of GMA, PLA, HEMA, and Isocyanate on the opaqueness of sample blends.

When blended with PLA, GMA-modified polystyrene does not necessarily lead to very small PLA phase domains as seen with HEMA-modified polystyrene. HEMA and GMA may both be blended together in polystyrene in order to drive down the PLA particle size while maintaining the transparency of the material. A PLA blend was prepared from PS modified with both HEMA (2.5 wt. %) and GMA (2 wt. %), two of the materials from Example 3 and are included in Tables 3 & 4. FIG. 5 shows that a combination HEMA and GMA produced synergistic results as the transparency of PLA blend is better than the blends with 2 wt. % GMA or 2.5 wt. % HEMA alone, respectively.

Figure 6:
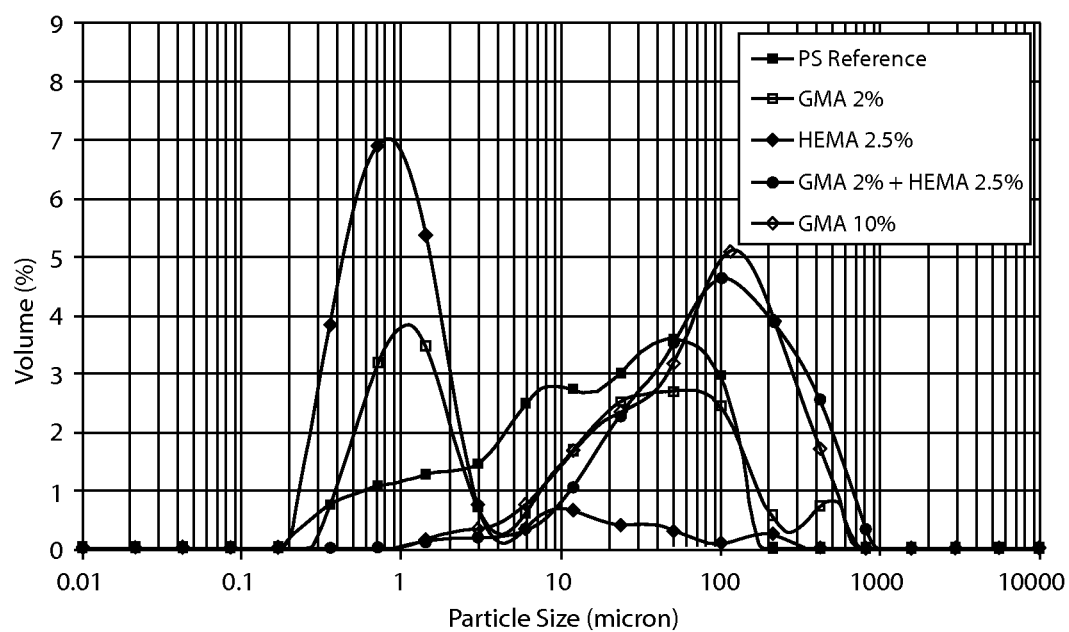
FIG. 6 is a graph illustrating the PLA phase domain size distribution in HEMA and GMA-modified polystyrene.

The solution light scattering results, depicted in FIG. 6, show that the PLA particle size increases; giving a distribution peak at around 100 µm for blends containing both GMA and HEMA. When GMA and HEMA are used separately, the PLA phase domain size has a distribution peaked at around 1 µm.

Example 5

Figure 7:
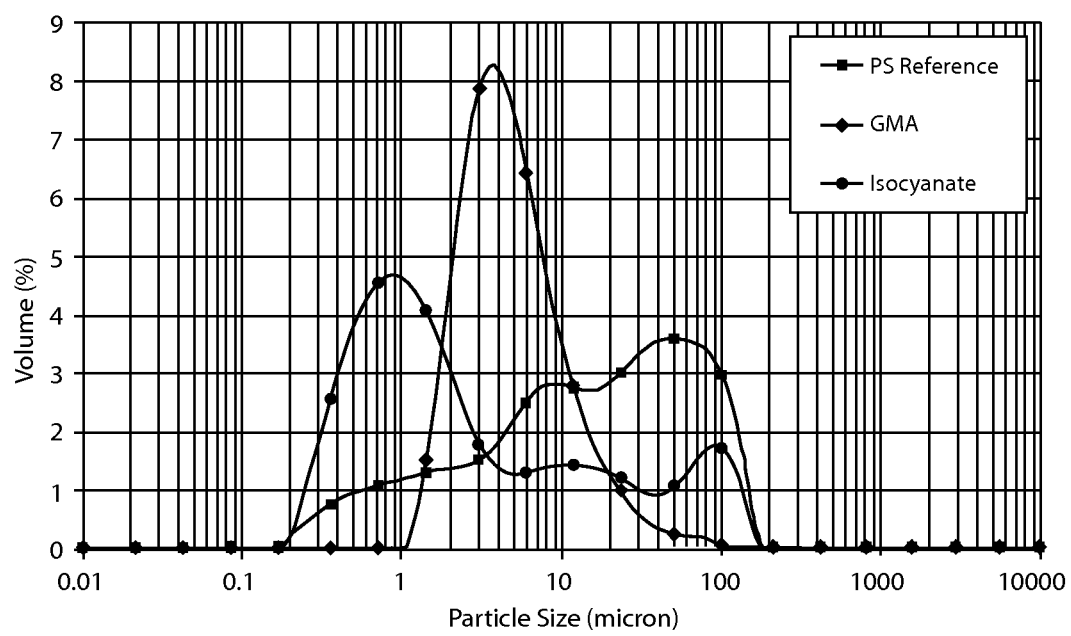
FIG. 7 is a graph illustrating the PLA phase domain size distribution in Isocyanate-modified polystyrene.

A blend of PLA and isocyanate-functionalized polystyrene was prepared. The compatibilization was driven by the reaction of isocyanate with the terminal hydroxyl groups of the polyester. The results of solution light scattering, depicted in FIG. 7, shows reduced PLA phase domains when compared to un-modified polystyrene as well as GMA-modified polystyrene at the same mass loading. The final blend was opaque as shown in FIG. 5, while the GMA-modified polystyrene was translucent.

The isocyanate monomer has a refractive index of 1.53, which is much closer to that of polystyrene (1.55) than PLA (1.439~1.456). In contrast, GMA has a refractive index of 1.4473, which could draw the refractive index of polystyrene closer to that of PLA, more effectively than isocyanate. A co-monomer, such as HEMA, also has a lower refractive index of 1.453, however, its PLA blend was still opaque. The unique transparency characteristic of GMA blend may come from favorable refractive index alteration of PS toward PLA. However, the epoxy-containing additives do not appear to have the same optical effect as GMA.

Example 6

In each of the examples shown above, the reactive comonomers were incorporated into the backbone of polystyrene. An alternative approach is the use of additives that contain reactive groups for grafting and compatibilization. In one example, Vikoflex 7190 epoxidized linseed oil was used during polymerization of polystyrene. The structure of the oil is shown below.

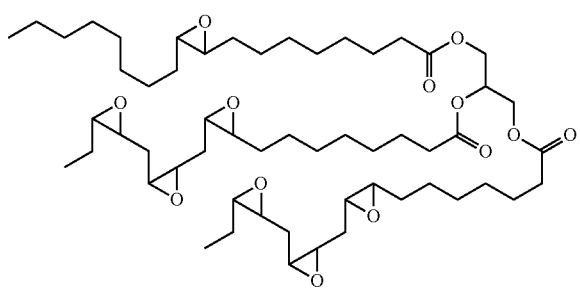 [SMILES: CCCCCCCCC1OC1CCCCCCCC(=O)OCC(COC(=O)CCCCCCC1OC1CC1OC1CC1OC1CC)OC(=O)CCCCCCCC1OC1CC1OC1CC1OC1CC]

Figure 8:
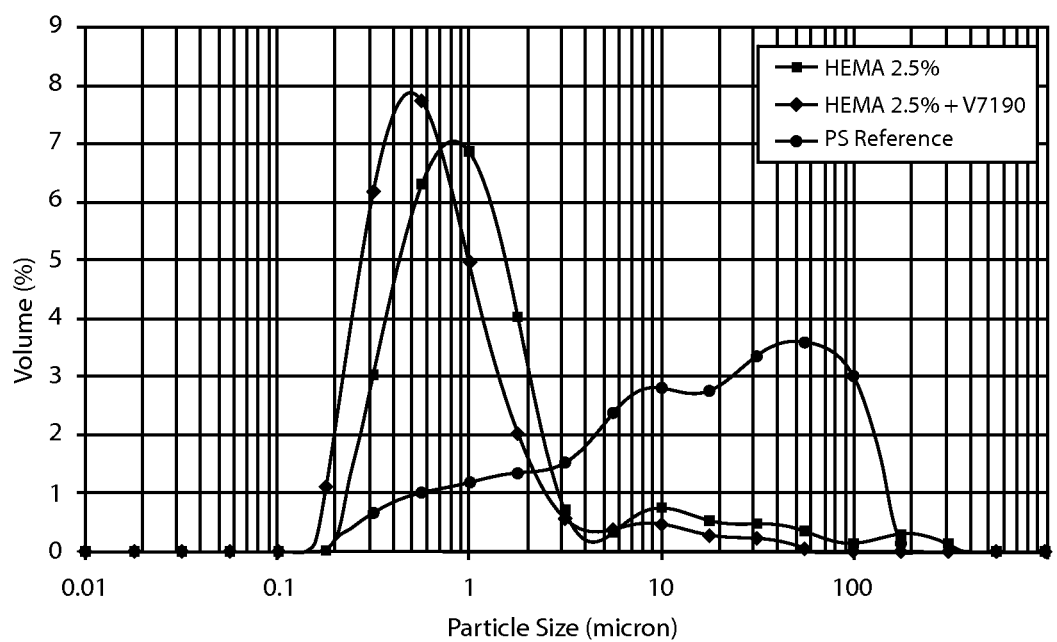
FIG. 8 is a graph illustrating the PLA phase domain size distribution in epoxy additive-containing polystyrene.

To improve the physical interaction of the additive toward polystyrene, a small amount of HEMA (2.5 wt. %) was also added to enhance the polarity of the polystyrene. FIG. 8 shows the PLA phase domain size after blending. With 2.5 wt. % HEMA, the PLA phase domain size was already very small. The addition of epoxidized linseed oil further reduces the size of PLA to 0.5 μm, with less tailing in the larger size range. Despite the small size of PLA domains, the final blend was still opaque.

Example 7

Figure 3:
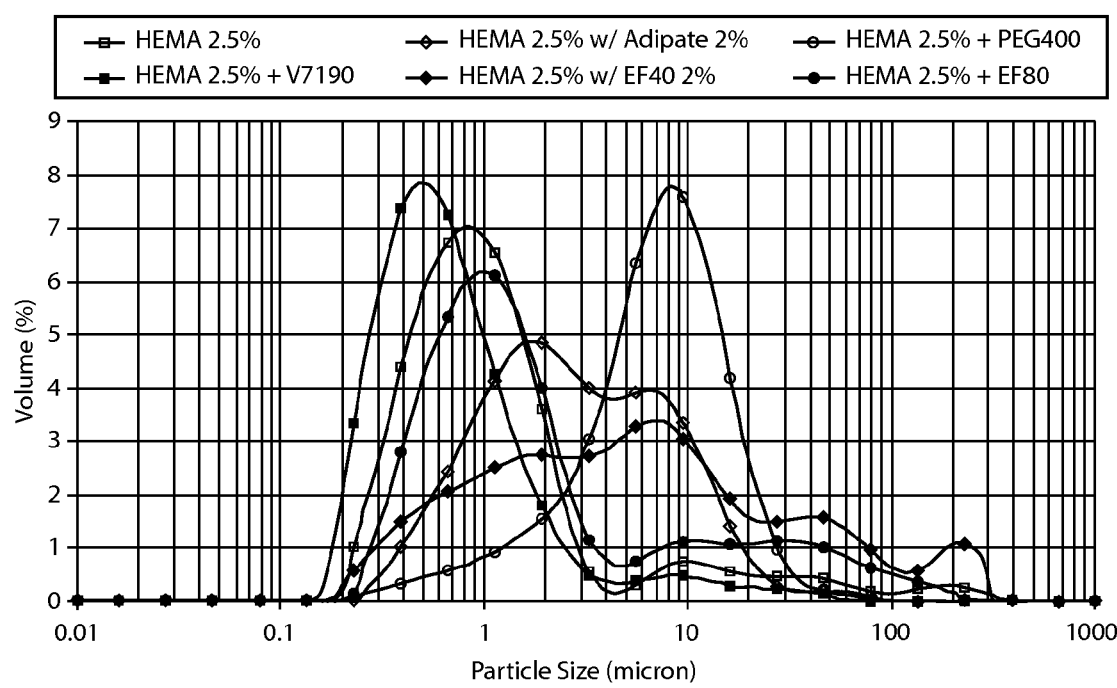
FIG. 3 is a graph illustrating PLA particle size distribution from blends of PLA in plasticized HEMA-modified polystyrene.
Figure 4:
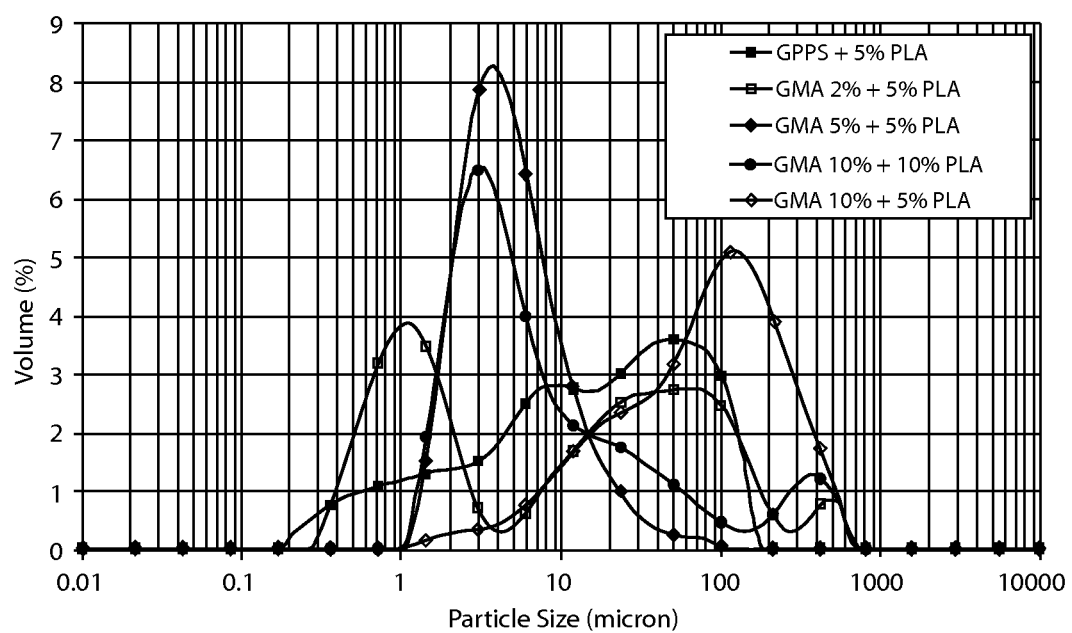
FIG. 4 is a graph illustrating PLA phase domain size distribution in GMA-modified polystyrene.

In a separate example, epoxy functional groups were introduced into polystyrene with the addition of an epoxy-containing plasticizer, for example, epoxidized linseed oil (Vikoflex® 7190, commercially produced by Arkema, Inc.). To facilitate homogenous distribution of this epoxy containing plasticizer in the polystyrene matrix, the base polystyrene was modified by copolymerization with polar vinyl functional co-monomer, for example, hydroxyethyl methacrylate (HEMA) in an amount of about 2.5 wt % in each sample. FIG. 3 shows the PLA phase domain distribution in HEMA-modified polystyrene plasticized with about 2% various plasticizers including Vikoflex® 7190. Clearly, the smallest particle size distribution was achieved with the epoxidized plasticizers.

While illustrative embodiments have been depicted and described, modifications thereof can be made by one skilled in the art without departing from the spirit and scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

As used herein, the term "monomer" refers to a relatively simple compound, usually containing carbon and of low molecular weight, which can react by combining one or more similar compounds with itself to produce a polymer.

As used herein, the term "co-monomer" refers to a monomer that is copolymerized with at least one different monomer in a copolymerization reaction resulting in a copolymer.

As used herein, the term "homopolymer" refers to a polymer resulting from polymerization of a single monomer species.

As used herein, the term "co-polymer," also known as a "heteropolymer," is a polymer resulting from polymerization of two or more monomer species. The term "co-polymer" includes of all types of co-polymers including random co-polymers and block co-polymers.

As used herein, the term "copolymerization" refers to the simultaneous polymerization of two or more monomer species.

As used herein, the term "polymer" generally includes, but is not limited to homopolymers, co-polymers, such as, for example, block, graft, random and alternating copolymers, and combinations and modifications thereof.

As used herein, the term "biodegradable" refers to any composition that is compostable or degrades from environmental heat, moisture, or from the action of naturally occurring microorganisms, such as bacteria, fungi, and algae.

Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

All testing performed by ASTM standards unless specified otherwise.

Depending on the context, all references herein to the "invention" may in some cases refer to certain specific embodiments only. In other cases it may refer to subject matter recited in one or more, but not necessarily all, of the claims. While the foregoing is directed to embodiments, versions and examples of the present invention, which are included to enable a person of ordinary skill in the art to make and use the inventions when the information in this patent is combined with available information and technology, the inventions are not limited to only these particular embodiments, versions and examples. Also, it is within the scope of this disclosure that the aspects and embodiments disclosed herein are usable and combinable with every other embodiment and/or aspect disclosed herein, and consequently, this disclosure is enabling for any and all combinations of the embodiments and/or aspects disclosed herein. Other and further embodiments, versions and examples of the invention may be devised without departing from the basic scope thereof and the scope thereof is determined by the claims that follow.

What is claimed is:

1. A biodegradable blend comprising:
    a styrenic copolymer exhibiting a number average molecular weight ranging from 75,000 g/mol to 150,000 g/mol; and
    a biodegradable polymer;
    wherein the styrenic copolymer comprises a first styrene monomer and one or more of an epoxy-functionalized monomer, a second styrene monomer, a polar co-monomer, and epoxidized glycerides oil, and wherein the biodegradable blend has a polydispersity index of 1.0 to 5.0; and
    wherein the styrenic copolymer is present in the blend in amounts ranging from 80 to 99 wt % based on the total weight of the blend.

2. The blend of claim 1, wherein the first styrene monomer is selected from the group consisting of styrene, alpha-methyl styrene, vinyl toluene, p-methyl styrene, t-butyl styrene, o-chlorostyrene, vinyl pyridine, and any combinations thereof.

3. The blend of claim 1, wherein the biodegradable polymer is selected from the group consisting of polylactic acid (PLA), polyhydroxybutyrates (PHB), polyhydroxyalkanoates (PHA), polycaprolactone (PCL), polyvinyl alcohol (PVA), and copolymers thereof, and combinations thereof.

4. The blend of claim 1, wherein the biodegradable polymer is present in the blend in amounts ranging from 1 to 20 wt % based on the total weight of the blend.

5. The blend of claim 1, wherein said blend has a refractive index ranging from 1.40 to 1.55.

6. The blend of claim 1, wherein the epoxy-functionalized monomer is an epoxy-functionalized (meth)acrylic monomer.

7. The blend of claim 6, wherein the epoxy-functionalized (meth)acrylic monomer is selected from the group consisting of glycidyl acrylate and glycidyl methacrylate and combinations thereof.

8. The blend of claim 1, wherein said blend has a particle size distribution having a peak particle size ranging from 0.3 to 3 µm.

9. The blend of claim 1, wherein the epoxy-functionalized monomer is present in the styrenic copolymer in amounts ranging from 1 to 10 wt %.

10. The blend of claim 1, further comprising a plasticizer selected from the group consisting of triglyceride oils and combinations thereof.

11. The blend of claim 10, wherein the plasticizer is present in amounts ranging from 0.5 to 10 wt % based on the total weight of the blend.

12. The blend of claim 1, wherein the styrenic copolymer comprises both the epoxy-functionalized monomer and the polar co-monomer.

13. A biodegradable blend comprising:
a styrenic copolymer exhibiting a weight average molecular weight ranging from 250,000 g/mol to 400,000 g/mol; and
a biodegradable polymer;
wherein the styrenic copolymer comprises a first styrene monomer and one or more of an epoxy-functionalized monomer, a second styrene monomer, a polar co-monomer, and epoxidized glycerides oil, and wherein the biodegradable blend has a polydispersity index of 1.0 to 5.0.

14. The blend of claim 13,
wherein the styrenic copolymer comprises the first styrene monomer and the epoxy-functionalized monomer, and wherein the epoxy-functionalized monomer is present in the blend in an amount ranging from 5 to 10 wt. %.

15. The blend of claim 14, wherein the epoxy-functionalized monomer is an epoxy-functional vinyl monomer.

16. The blend of claim 15, wherein the epoxy-functional vinyl monomer is an epoxy-functional (meth)acrylic monomer.

17. The blend of claim 16, wherein the epoxy-functional (meth)acrylic monomer includes an acrylate or a methacrylate.

18. The blend of claim 16, wherein the epoxy-functional (meth)acrylic monomer is glycidyl acrylate or glycidyl methacrylate (GMA).

19. The blend of claim 18, wherein the epoxy-functional (meth)acrylic monomer is glycidyl methacrylate (GMA) and wherein the biodegradable blend further comprises hydroxyethylmethacrylate (HEMA).

20. The blend of claim 16, wherein the epoxy-functional (meth)acrylic monomer is glycidyl ethacrylate or glycidyl itaconate.

21. An article of manufacture comprising the blend of claim 1.

* * * * *